United States Patent
Igarashi

(10) Patent No.: US 7,984,993 B2
(45) Date of Patent: Jul. 26, 2011

(54) PROJECTOR INCLUDING LIGHT SOURCE CONTROLLING SECTION FOR TURNING LIGHT SOURCE ON AND OFF, CONTROL METHOD, CONTROL PROGRAM, AND RECORDING MEDIUM

(75) Inventor: Mitsuhiko Igarashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 518 days.

(21) Appl. No.: 12/119,931

(22) Filed: May 13, 2008

(65) Prior Publication Data

US 2008/0297737 A1  Dec. 4, 2008

(30) Foreign Application Priority Data

Jun. 4, 2007 (JP) .................. 2007-148302

(51) Int. Cl.
G03B 21/20 (2006.01)
G01J 1/32 (2006.01)
(52) U.S. Cl. ........................................ 353/85; 250/205
(58) Field of Classification Search .............. 353/85–87, 353/88, 97; 348/634, 789, 759, 794; 250/239, 250/208.1, 205; 369/116, 117, 53.37, 53.45; 349/13, 5
See application file for complete search history.

(56) References Cited

U.S. PATENT DOCUMENTS

| | | | | |
|---|---|---|---|---|
| 4,433,347 A | * | 2/1984 | Sugiyama et al. | 386/253 |
| 7,393,110 B2 | * | 7/2008 | Bronstein et al. | 353/85 |
| 7,520,624 B2 | * | 4/2009 | Lippey et al. | 353/85 |
| 2006/0197918 A1 | * | 9/2006 | Kobayashi | 353/57 |

FOREIGN PATENT DOCUMENTS

| | | |
|---|---|---|
| JP | 09-204728 | 8/1997 |
| JP | 09-320179 A | 12/1997 |
| JP | 2001-249402 | 9/2001 |
| JP | 2002-202487 | 7/2002 |
| JP | 2002-271717 | 9/2002 |
| JP | 2002-271717 A | 9/2002 |
| JP | 2003-029332 | 1/2003 |
| JP | 2004-118887 A | 4/2004 |
| JP | 2005-326646 | 11/2005 |
| JP | 2005326646 A | * 11/2005 |
| JP | 2006-072037 | 3/2006 |
| JP | 2006-243551 A | 9/2006 |
| KR | 2006018091 | * 2/2006 |

* cited by examiner

*Primary Examiner* — Georgia Y Epps
*Assistant Examiner* — Jennifer Bennett
(74) *Attorney, Agent, or Firm* — AdvantEdge Law Group, LLC

(57) ABSTRACT

A projector to form image light by modulating light emitted from a light source according to image information and enlarges and projects the image light includes a projector main body with a light passing opening regulated by a blocking member, a reproduction device, and a control unit to control operation of projector components. The reproduction device reproduces information recorded on inserted recording medium. The control unit includes a startup information receiving section, a closed condition checking section, a medium judging section, and a light source controlling section. The light source controlling section executes immediate light turn-on control when the light passing opening is in the opened condition and image/video media exists.

7 Claims, 3 Drawing Sheets

PROJECTOR INCLUDING LIGHT SOURCE CONTROLLING SECTION FOR TURNING LIGHT SOURCE ON AND OFF, CONTROL METHOD, CONTROL PROGRAM, AND RECORDING MEDIUM

CROSS REFERENCE TO RELATED APPLICATIONS

The present application claims priority and incorporates by reference in its entirety Japanese Patent Application No. 2007-148302 filed Jun. 4, 2007.

BACKGROUND

Currently, one type of projector is known in the industry, which includes a projector main body for forming image light by modulating light emitted from a light source according to image information and projecting the enlarged image light, and a reproduction device to which a recording medium is attachable for reproduction of information recorded on the recording medium. According to at least one available projector, the projector main body and the reproduction device are combined into one body as referred to in Japanese Patent Publication No. JP-A-2006-72037.

For the reproduction device, various technologies for judging types of the attached recording medium have been proposed as referred to in Japanese Patent Publication No. JP-A-9-204728. For example, a technology disclosed in the Japanese Patent Publication No. JP-A-9-204728 judges types of attached optical disk such as CD (compact disk) and DVD (digital versatile disk).

According to the projector shown in the Japanese Patent Publication No. JP-A-2006-72037, only audio data is reproduced for reproduction of information recorded on the recording medium when the attached recording medium is a recording medium used exclusively for audio (such as audio CD). In this case, light emission from the light source for forming an image (image light) is unnecessary.

Combining the technology shown in the Japanese Patent Publication No. JP-A-9-204728 with the projector shown in the Japanese Patent Publication No. JP-A-2006-72037, for example, light emission from the light source may be stopped when the attached recording medium is of the type used exclusively for audio, and light may be emitted only when the recording medium is a recording medium not for audio only but including image data (such as DVD video) based on judgment of the types of the attached recorded medium.

According to this structure, however, a user attaches a recording medium including image data to the reproduction device and starts the projector (power on), and then the light source emits light based on the judgment that the recording medium involves image data. Among other problems, this structure may require a longer time from the startup of the projector to image formation, and thus reduces the relative ease of use. Therefore, a technology capable of reducing starting time of the projector with improved ease of use is demanded.

SUMMARY

A projector, control method, control program, and recording medium have been developed in response to the current state of the art, and in particular, in response to these and other problems, needs, and demands that have not been fully or completely solved by currently available projector systems. More specifically, various embodiments described in the disclosure provide a projector, a control method, a control program, and a recording medium, which are capable of reducing starting time and increasing relative ease of use.

A projector according to one embodiment includes a projector main body, a reproduction device, a light passing opening, a blocking member, and a control unit. The projector main body forms image light by modulating light emitted from a light source according to image information and enlarges and projects the image light. The reproduction device reproduces information recorded on a recording medium attached to the reproduction device, and is combined with the projector main body into one body. The light passing opening is provided on an outer housing of the projector such that the image light may pass through the light passing opening. The blocking member closes the light passing opening. The control unit controls the whole projector.

In one embodiment, the control unit contains a startup information receiving section, a closed condition checking section, a medium judging section, and a light source controlling section. The startup information receiving section receives startup information about startup of the projector. The closed condition checking section checks/determines whether the light passing opening is closed by the blocking member or not. The medium judging section judges/determines types of the recording medium. The light source controlling section controls operation of the light source based on the check result of the closed condition checking section and the judgment result of the medium judging section after the startup information receiving section receives the startup information. In one embodiment, the light source controlling section executes immediate light turn-on control under which the light source immediately emits light when the closed condition checking section determines that the light passing opening is not in the closed condition by the blocking member but in the opened condition.

Reference in the specification to "recording medium" as used in the instant application, includes any mechanism that provides recorded information (i.e., stores and/or transmits) in a form readable by a machine (e.g., a projector). For example, the recording medium as used herein includes disk-shaped recording media such as CD, DVD, MO (magneto optical disk and other magnetic disk and/or optical storage media), card-shaped recording media such as memory card and/or other flash memory devices, and other various types of recording media such as read only memory (ROM), random access memory (RAM), electrical, optical, acoustical or other form of propagated signals (e.g., carrier waves, infrared signals, digital signals), etc. The recording medium may include a variety of different types of recorded information including audio, video, multimedia, data, and combinations thereof. The terms "storage medium", and "computer readable medium" are often synonymously used herein and are interchangeable with "recording medium" as previously defined. Moreover, in various embodiments the recording medium is a type of portable storage including any of the previously described storage mechanisms.

The control unit included in the projector according to at least one embodiment has the startup information receiving section, the closed condition checking section, the medium checking section, and the light source controlling section. Thus, the projector may be started in the following manner.

The startup information receiving section receives startup information about startup of the projector based on an operation signal outputted from an operation unit provided on the projector when an input operation commanding the projector to start (turn on power source) is executed by a user through the operation unit, for example (startup information receiving step).

The closed condition checking section checks whether the light passing opening is closed by the blocking member based on a signal outputted from a position detection unit for detecting the position of the blocking member, for example (closed condition checking step).

The medium checking section reads information in the read-in region (management information) of the recording medium attached to the reproduction device, the folder structure (format) of the information recorded on the recording medium, and the like, and judges the types of the recording medium (for audio only or containing image data), for example (medium judging step).

The light source control unit controls the operation of the light source based on the check result of the closed condition checking section and the judgment result of the medium judging section after the startup information receiving section receives the startup information (light source operation control step).

When the recording medium containing image data is attached to the reproduction device by the user, the light passing opening is generally set at the opened position by the user through operation of the blocking member such that image light corresponding to the image data recorded on the recording medium may be enlarged and projected from the projector main body through the light passing opening. Thus, the control unit may assume that the recording medium contains image data without executing the medium judging step when the light passing opening is in the opened condition.

According to at least one embodiment, the light source controlling section executes the immediate light turn-on control under which the light source immediately emits light when the closed condition checking section determines that the light passing opening is not in the condition closed by the blocking member but in the opened condition after the startup information receiving section receives the startup information. Then, the control unit reproduces the information recorded on the recording medium.

The control unit having this structure immediately turns on the light source and reproduces the information recorded on the recording medium without judging the type of the recording medium when the light passing opening is not in the condition closed by the blocking member but in the opened condition at the startup of the projector. Thus, the time that may be required until formation of image (image light), i.e., the starting time of the projector in case that the attached recording medium contains image data becomes shorter than that time in the structure of the related art. Accordingly, ease of use may be increased.

It is preferable that the light source controlling section executes light turn-off control under which the light source is turned off when it is determined that the recording medium is of the type used exclusively for non-visual, such as audio, by the medium judging unit after execution of the immediate light turn-on control.

As described above, in one embodiment, the control unit immediately turns on the light source without judging the type of the recording medium when the light passing opening is opened at the time of the startup of the projector. Thus, even when the attached recording medium is of the non-visual type, such as that used exclusively for audio, for example, the light source is immediately turned on based on the judgment that the light passing opening is opened.

According to the control unit of the projector in at least one embodiment, the medium judging section judges the type of the recording medium after the light source controlling section executes the immediate light turn-on control. Then, the light source controlling section executes the light turn-off control under which the light source is turned off when the medium judging section judges that the recording medium is for non-visual, such as audio only, after execution of the immediate light turn-on control. Thus, unnecessary light emission from the light source may be eliminated, and power saving may be achieved.

A control method of a projector which includes a projector main body which forms image light by modulating light emitted from a light source according to image information and enlarges and projects the image light, and a reproduction device which reproduces information recorded on a recording medium attached to the reproduction device and is combined with the projector main body into one body, according to at least one embodiment includes: a startup information receiving step which receives startup information about startup of the projector; a closed condition checking step which checks whether the light passing opening provided on an outer housing of the projector such that the image light may pass through the light passing opening is closed by a blocking member or not; a medium judging step which judges types of the recording medium attached to the reproduction device; and a light source control step which controls operation of the light source based on the check result of the closed condition checking step and the judgment result of the medium judging step after the startup information is received in the startup information receiving step. The light source control step immediately turns on the light source when it is determined that the light passing opening is not in the closed condition but in the opened condition by the blocking member in the closed condition checking step.

Since the control method, according to at least one embodiment, is performed by the projector described above, operations and advantages similar to those of the projector may be provided.

A control program of a projector which includes a projector main body which forms image light by modulating light emitted from a light source according to image information and enlarges and projects the image light, and a reproduction device which reproduces information recorded on a recording medium attached to the reproduction device and is combined with the projector main body into one body according to various embodiments includes a program under which a control unit of the projector executes the control method described above.

A recording medium, according to one embodiment, is a recording medium on which the control program described above is recorded in such a manner as to be readable by a computer.

Since the control program and the recording medium having the structure described above are used to perform the above control method, operations and advantages similar to those of the above control method may be provided.

Moreover, since the control program described above is recorded on the recording medium, the program may be handled with relative ease.

BRIEF DESCRIPTION OF THE DRAWINGS

Embodiments of the disclosure are described with reference to the accompanying drawings, wherein like reference numbers designate like elements.

DETAILED DESCRIPTION OF EXEMPLARY EMBODIMENTS

In the following detailed description, reference is made to the accompanying drawings which form a part hereof wherein like numerals designate like parts throughout, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. Reference in the specification to "one embodiment" or "an embodiment" means that a particular feature, structure, or characteristic described in connection with the embodiment is included in at least one embodiment of the disclosure. The meaning of "in" may include "in" and "on." The appearances of the phrases "in one embodiment" or "in an embodiment" in various places in the specification do not necessarily all refer to the same embodiment, but it may.

An embodiment according to the disclosure is hereinafter described with reference to the drawings. Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment.

Structure of Projector

Figure 1:
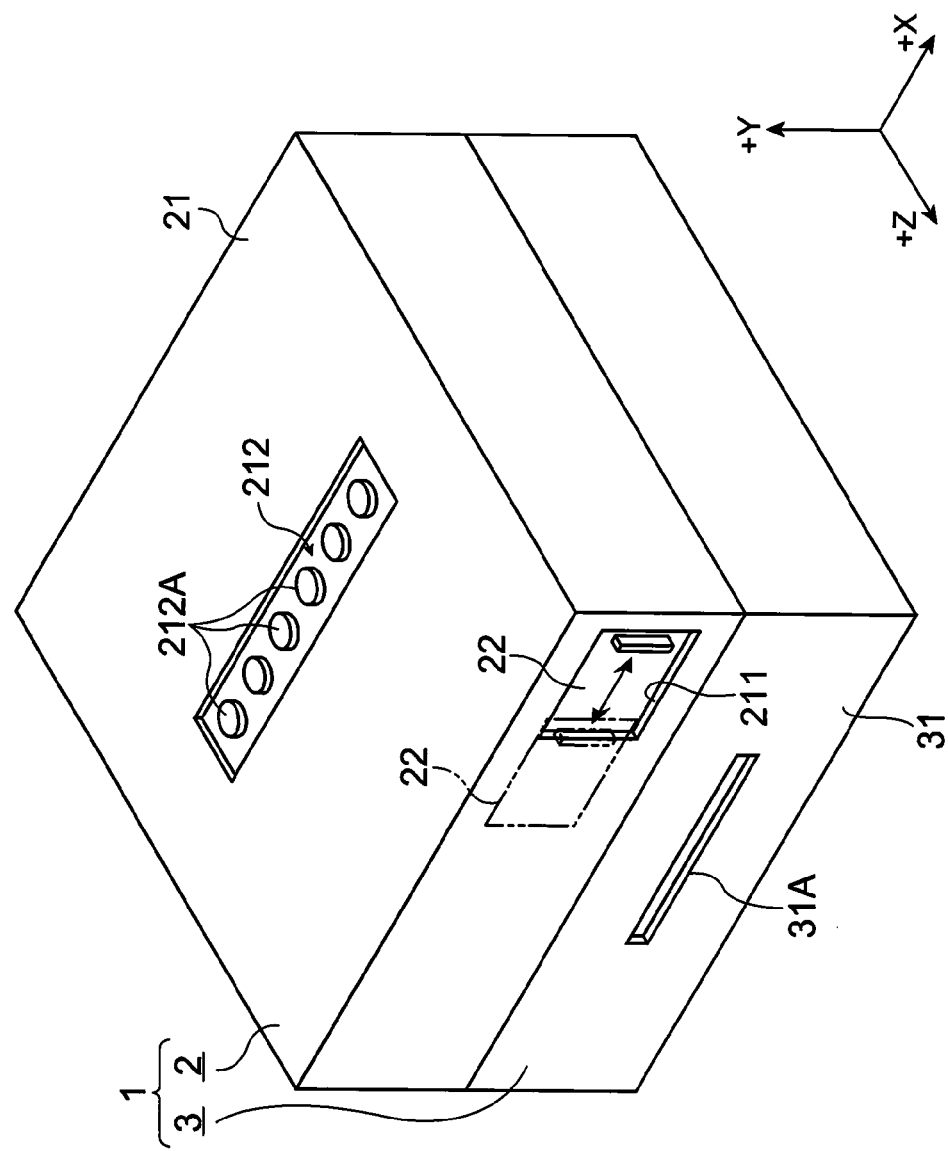
FIG. 1 is a perspective view schematically illustrating a general structure of a projector according to an embodiment.

FIG. 1 is a perspective view schematically illustrating a general structure of a projector 1. In FIG. 1, the projection direction of image light coincides with a Z axis, and two axes orthogonal to the Z axis are X axis (horizontal axis) and Y axis (vertical axis) for simplifying the explanation.

Figure 2:
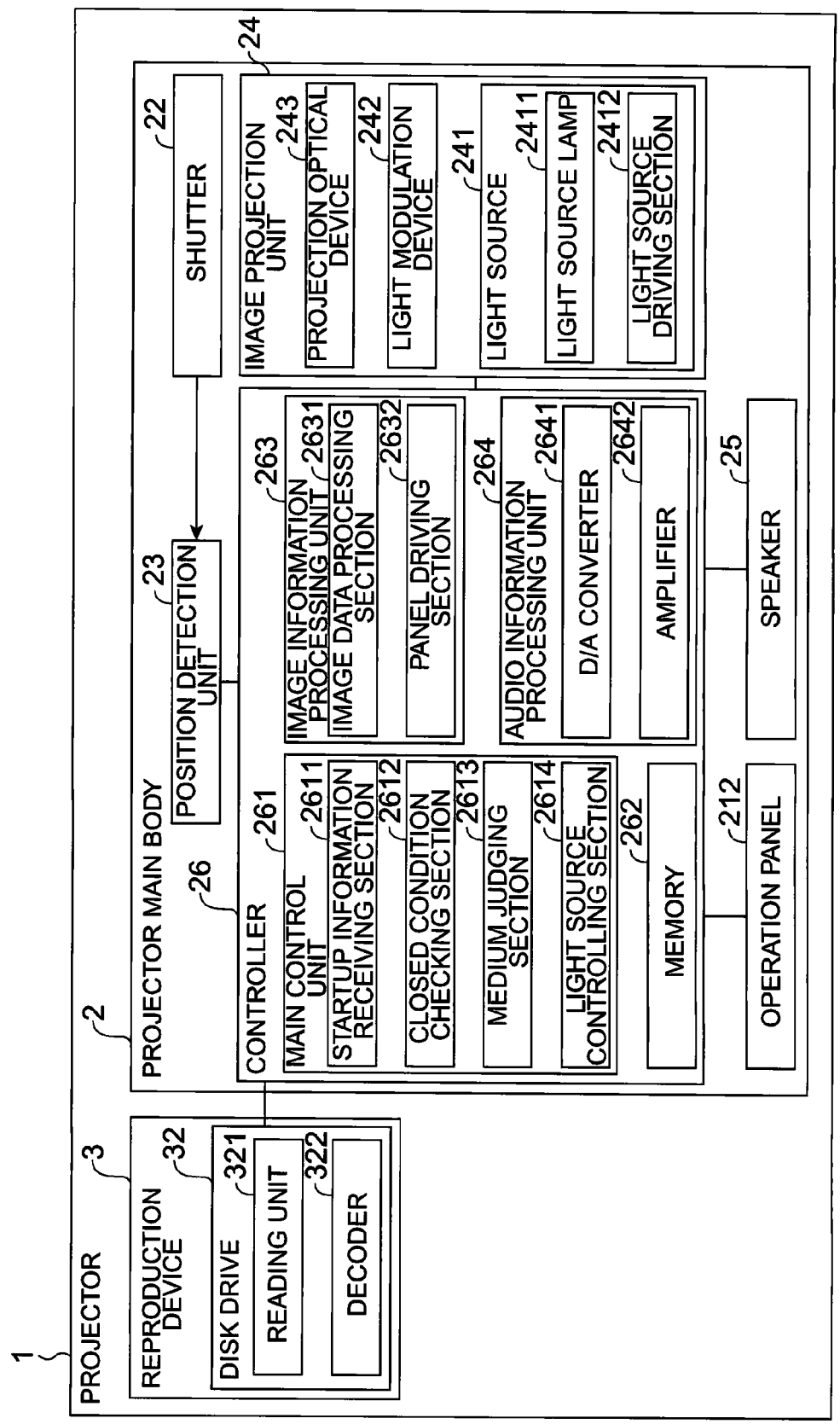
FIG. 2 is a block diagram schematically showing the structure of the projector according to the embodiment.

FIG. 2 is a block diagram schematically showing the structure of the projector 1.

The projector 1 forms a projection image on a screen (not shown), and outputs audio corresponding to the projection image. As illustrated in FIG. 1, the projector 1 is vertically sectioned into a projector 2 and a reproduction device 3 which are combined as one body.

As illustrated in FIG. 1, the reproduction device 3 is disposed on the lower side (−Y axis side) of the projector main body 2, and a disk drive 32 (FIG. 2) is provided within a lower housing 31 having a substantially rectangular parallelepiped shape.

As illustrated in FIG. 1, an insertion hole 31A through which a recording medium such as CD and DVD (hereinafter referred to as optical disk) is provided on the front surface (end surface in +Z axis direction) of the lower housing 31.

The disk drive 32 is connected with the projector main body 2 by a signal cable or the like to operate under the control of a controller of the projector main body 2 as will be described later. More specifically, the disk drive 32 carries the optical disk inserted through the insertion hole 31A to a predetermined position by an auto loading mechanism (not shown), and rotates the optical disk by a driving unit such as a spindle motor (not shown). Then, the disk drive 32 reads reproduction data (image data and audio data) recorded on the optical disk by using a reading unit 321 such as a pickup (FIG. 2), decodes (expands) the data according to the recording system of the optical disk by using a decoder 322 (FIG. 2), and outputs the decoded data to the projector main body 2.

The projector main body 2 forms image light by modulating light emitted from a light source according to image information, and enlarges and projects the image light thus formed on the screen (not shown). As illustrated in FIGS. 1 and 2, the projector main body 2 has a shutter 22 as a blocking member, a position detection unit 23 (FIG. 2), an image projection unit 24 (FIG. 2), a speaker 25 (FIG. 2), and a controller 26 (FIG. 2) within an upper housing 21 (FIG. 1) as an outer housing having a substantially rectangular parallelepiped shape.

As illustrated in FIG. 1, a light passing opening 211 through which light enlarged and projected by a projection optical device described later and constituting the image projection unit 24 passes is provided on the front surface of the upper housing 21.

As illustrated in FIG. 1, an operation panel 212 having a plurality of operation buttons 212A operated for power on/off of the projector 1, image quality control of projection image, sound volume adjustment, and reproduction, stop, and other operations of the optical disk by using the reproduction device 3 is provided on the upper surface (end surface in +Y axis direction) of the upper housing 21. When the operation buttons 212A are pushed by the user, operation signals are outputted from the operation panel 212 to the controller 26.

The operation panel 212 provided on the projector main body 2, in one embodiment, may be disposed on the reproduction device 3. Alternatively, the plural operation buttons 212A may be divided into two parts in an appropriate manner to be provided on both the projector main body 2 and the reproduction device 3.

As illustrated in FIG. 1, the shutter 22 as a plate-shaped member capable of closing the light passing opening 211 is provided on the back of the front surface of the upper housing 21 in such a condition as to shift between a closed position for closing the light passing opening 211 and an opened position for opening the light passing opening 211. The shutter 22 is disposed at the opened position when receiving projection of image light from the projector main body 2 (position indicated by imaginary line in FIG. 1), and at the closed position when receiving no projection of image light from the projector main body 2 (position indicated by solid line in FIG. 1) by the operation of the user.

The position detection unit 23 detects the position of the shutter 22 and outputs a signal to the controller 26. According to one embodiment, the position detection unit 23 has a normal-close-type leaf switch, and constantly outputs signals to the controller 26 in the normal condition. When the shutter 22 is disposed at the opened position, the position detection unit 23 contacts the shutter 22 to come into the open condition, and suspends signal output to the controller 26.

The position detection unit 23 may be any device as long as it may detect the position of the shutter 22, and thus may be a mechanical switch, a photo-sensor, and other various types.

The image projection unit 24 forms image light and projects enlarged image light on the screen under the control of the controller 26. As illustrated in FIG. 2, the image projection unit 24 has a light source 241, a light modulation device 242, a projection optical device 243, and other components.

The light source 241 emits light toward the light modulation device 242 under the control of the controller 26. As illustrated in FIG. 2, the light source 241 has a light source lamp 2411 and a light source driving section 2412.

The light source lamp 2411 constituted by an extra-high pressure mercury lamp in one embodiment is not limited to the extra-high pressure mercury lamp but may be other discharge light emission type light source lamp such as metal halide lamp and xenon lamp. Alternatively, various types of solid light emitting element such as light emitting diode, laser diode, organic EL (electro luminescence) element, and silicon light emitting element may be used instead of using discharge light emission type light source lamp.

The light source driving section 2412 drives the light source lamp 2411 by predetermined driving voltage under the control of the controller 26.

The light modulation device 242 modulates light emitted from the light source lamp 2411 into image light according to a driving signal and releases the image light to the projection optical device 243.

The projection optical device 243 enlarges and projects the image light released from the optical modulation unit 242 onto the screen.

The controller 26 has a main control unit 261 such as CPU (central processing unit) as a controlling unit, and executes predetermined processes under a control program stored in a memory 262 to control the overall operation of the projector 1. Concerning the controller 26, the function for processing data outputted from the reproduction device 3 (image data and audio data) is chiefly described, and other functions for processing signals received from outside devices (image signal and audio signal) are not explained herein. As illustrated in FIG. 2, the controller 26 has an image information processing unit 263, audio information processing unit 264, and other components as well as the main control unit 261 and the memory 262.

The image information processing unit 263 applies predetermined processing to image data outputted from the reproduction device 3 in response a control command issued from the main control unit 261, and outputs a driving signal based on the processed image data to the light modulation device 242 such that appropriate image light may be formed by the light modulation device 242. As illustrated in FIG. 2, the image information processing unit 263 has an image data processing section 2631, a panel driving section 2632, and other components.

The image data processing section 2631 applies various types of image data processing to the image data outputted from the reproduction device 3. This image data processing involves resolution conversion process for matching resolution of the image data with resolution of the light modulation device 242 (pixel numbers), image size adjustment process such as expansion and contraction, image quality correcting process for correcting hue, chromaticity, contrast, sharpness, luminance and the like, trapezoidal distortion correcting process, gamma correcting process, and other processes. Though not specifically shown in the figure, the image data processing section 2631 has an image memory used when performing these image data processes. The image memory is a section for buffering the inputted image data, and is constituted by a frame buffer for storing all image data for one screen or a line buffer for storing scan data for one line in the horizontal direction, for example.

The panel driving section 2632 produces driving signals for driving the light modulation device 242 from the image data to which the image data processing has been applied by the image data processing section 2631, and outputs the driving signals to the light modulation device 242 such that image (image light) may be formed by the light modulation device 242.

The audio information processing unit 264 applies predetermined processing to audio data outputted from the reproduction device 3 in response to a control command from the main control unit 261, and outputs audio signals to the speaker 25 such that audio corresponding to the audio signals may be released from the speaker 25. As illustrated in FIG. 2, the audio information processing unit 264 has a D/A converter 2641 which applies D/A conversion to the audio data outputted from the reproduction device 3 and outputs the D/A converted audio signals, an amplifier 2642 which amplifies the audio signals after D/A conversion by the D/A converter 2641 and outputs the amplified audio signals to the speaker 25, and other components.

The main control unit 261 reads the control program stored in the memory 262 and executes the control program. As illustrated in FIG. 2, the main control unit 261 has a startup information receiving section 2611, a closed condition checking section 2612, a medium judging section 2613, a light source controlling section 2614, and other sections.

The startup information receiving section 2611 receives startup information about startup of the projector 1. For example, the startup information receiving section 2611 receives an operation signal outputted from the operation panel 212 as startup information when input operation for power on is executed by the user through the operation panel 212 under the standby condition where power is supplied from a sub power source of a power source unit of the projector 1 to only a part of the components of the projector 1 (such as controller 26) with a main power source of the power source unit of the projector 1 turned off. Though not shown in the figure, the startup information receiving section 2611 similarly receives an operation signal outputted from a remote controller as startup information when input operation for power on is executed by the user through the remote controller.

The closed condition checking section 2612 checks whether the light passing opening 211 is closed by the shutter 22 or not. According to one embodiment, the closed condition checking section 2612 checks whether the shutter 22 is located at the opened position or closed position based on signals outputted from the position detection unit 23. More specifically, the position detection unit 23 constantly outputs signals to the controller 26 in the normal condition, and stops output of the signals to the controller 26 when the shutter 22 is located at the opened position as discussed above. Thus, the closed condition checking section 2612 determines that the shutter 22 is located at the closed position when receiving signals from the position detection unit 23, and determines that the shutter 22 is located at the opened position when not receiving signals from the position detection unit 23.

The medium judging section 2613 judges the type of the optical disk attached to the reproduction device 3 (information recorded on the optical disk). According to one embodiment, the medium judging section 2613 reads information in the read-in region (management information) of the attached optical disk, the folder structure (format) of the data recorded on the optical disk, and the like by driving the disk drive 32 to judge the type of the optical disk (such as audio CD, DVD audio, multimedia data, and DVD video).

The light source controlling section 2614 outputs predetermined control commands to the light source driving section 2412 to control operation of the light source lamp 2411 based on the check result of the closed condition checking section 2612 and the judgment result of the medium judging section 2613 after the startup information receiving section 2611 receives startup information.

Operation of Projector

Figure 3:
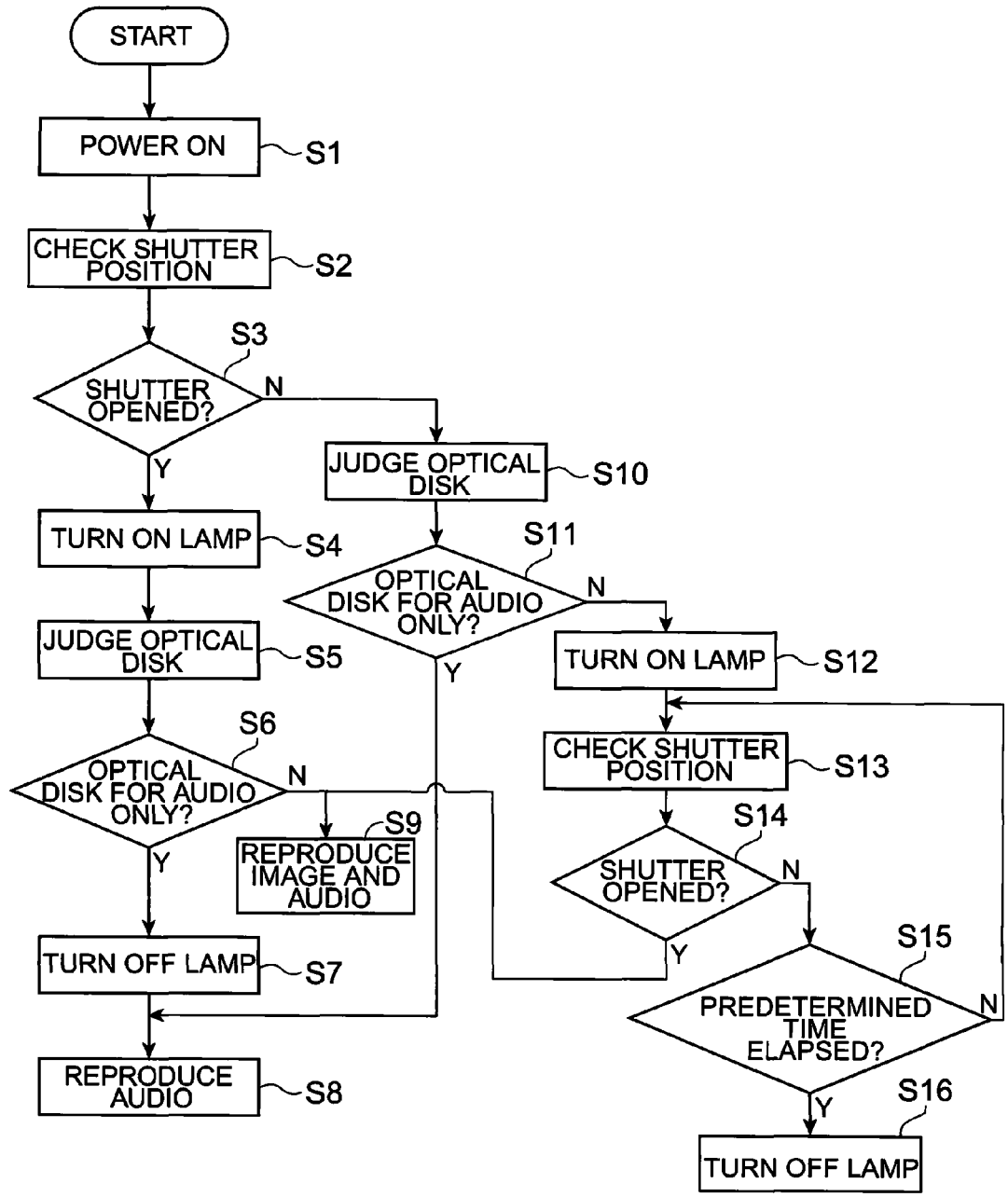
FIG. 3 is a flowchart showing a control method of the projector according to the embodiment.

Turning now to FIG. 3, a method or process of control, in accordance with various embodiments, is described in terms of firmware, software, and/or hardware with reference to flow diagram. Describing a method by reference to a flow diagram enables one skilled in the art to develop programs, including instructions to carry out the processes and methods on suitably configured projectors. In various embodiments, portions of the operations to be performed by a projection device may constitute circuits, filters, general purpose processors (e.g., micro-processors, micro-controllers, or digital signal processors), special purpose processors (e.g., application specific integrated circuits or ASICs), state machines, hardware arrays, reconfigurable hardware, and/or software made up of executable instructions. The executable instructions may be embodied in program code, firmware logic, reconfigurable logic, a hardware description language, a state machine, an application-specific integrated circuit (ASIC), or combinations thereof.

With respect to various embodiments using a software implementation (e.g., a hardware projection simulator), at least one of the processors of a suitably configured projection device executes the instructions from a storage and/or recording medium. The computer-executable instructions may be written in a computer programming language or executable code. If written in a programming language conforming to a recognized standard, such instructions may be executed on a variety of hardware platforms and may interface with a variety of operating systems. Although the various embodiments are not described with reference to any particular programming language, it may be appreciated that a variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software by a device causes the processor of the projector to perform an action or a produce a result.

Referring now to FIG. 3, the control method (startup method) of the projector 1 having this structure is now described with reference to the drawings. More specifically, FIG. 3 is a flowchart showing a portion of the control method that may be used by the projector 1.

In the following description, it is assumed that an optical disk has been already attached to the reproduction device 3 of the projector 1 under the standby condition.

When the user executes input operation for power on by operating the operation panel 212, the startup information receiving section 2611 receives an operation signal as startup information outputted from the operation panel 212 (step S1: startup information receiving step). Then, the main control unit 261 turns on the main power source such that the main power source may supply power to all the constituting elements.

After step S1, the closed condition checking section 2612 checks whether the shutter 22 is located at the opened position or at the closed position based on the signal outputted from the position detection unit 23 (step S2: closed condition checking step).

When it is determined that the shutter 22 is located at the opened position as the check result of the closed condition checking section 2612 in step S2 (step S3), the light source controlling section 2614 outputs a predetermined control command to the light source driving section 2412 to perform immediate light emission control under which the light source lamp 2411 emits light without judging the type of the optical disk (step S4: light source control step) by the medium judging section 2613.

After step S4, the medium judging section 2613 judges the type of the optical disk attached to the reproduction device 3 (step S5: medium judging step).

When it is judged as a result of judgement by the medium judging section 2613 in step S5 that the optical disk is of the type used exclusively for non-visual or audio (such as audio CD and DVD audio) (step S6), the light source controlling section 2614 outputs a predetermined control command to the light source driving section 2412 to perform light turn-off control under which the light source lamp 2411 is turned off (step S7: light source control step).

After step S7, the main control unit 261 drives the disk drive 32 such that audio data may be sequentially outputted from the attached optical disk (such as audio CD and DVD audio). Then, the main control unit 261 outputs a predetermined control command to the audio information processing unit 264. Based on this control command, the audio information processing unit 264 processes the audio data sequentially outputted from the disk drive 32, and the speaker 25 generates audio corresponding to the processed audio data (step S8).

When it is determined as a result of judgement by the medium judging section 2613 in step S5 that the optical disk is of the type containing image data (such as DVD video) (step S6), the main control unit 261 performs the following processes (step S9).

The main control unit 261 drives the disk drive 32 such that image data and audio data may be sequentially outputted from the attached optical disk (such as DVD video). Then, the main control unit 261 outputs a predetermined control command to the image information processing unit 263. Based on this control command, the image information processing unit 263 processes the image data sequentially outputted from the disk drive 32, and the image projection unit 24 enlarges and projects image light corresponding the image data onto the screen (image reproduction). The main control unit 261 also achieves audio reproduction similar to that in step S8 simultaneously with the image reproduction.

Returning to step S2, when it is determined that the shutter 22 is not located at the opened position but at the closed position based on the check result of the closed condition checking section 2612 in step S2 (step S3), the medium judging section 2613 judges the type of the optical disk attached to the reproduction device 3 similarly to step S5 (step S10: medium judging step).

When it is determined as a result of judgment by the medium judging section 2613 in step S10 that the optical disk is of the type used exclusively for audio (such as audio CD and DVD audio) (step S11), the main control unit 261 goes to step S8 and reproduces audio data of the optical disk (such as audio CD and DVD audio).

When it is determined that the optical disk contains image data based on the judgment result of the medium judging section 2613 in step S10 (step S11), the light source controlling section 2614 outputs a predetermined control command to the light source driving section 2412 under which the light source lamp 2411 emits light (step S12: light source control step).

After step S12, the closed condition checking section 2612 again checks whether the shutter 22 is located at the opened position or at the closed position based on the signal outputted from the position detection unit 23 (step S13: closed condition checking step).

When it is determined that the shutter 22 is located at the opened position based on the check result of the closed condition checking section 2612 in step S13 (step S14), that is, when the shutter 22 located at the closed position at the startup of the projector 1 (step S1) is shifted to the opened position by the user through operation of the shutter 22, the main control unit 261 goes to step S9 and reproduce image data and audio data of the optical disk (such as DVD video).

When it is determined that the shutter 22 is located at the closed position based on the check result of the closed condition checking section 2612 in step S13 (step S14), that is, the shutter 22 located at the closed position at the startup of the projector 1 remains at the same position, the main control unit 261 performs the following control.

The main control unit 261 judges whether a set time stored in the memory 262 has elapsed from the start of light emission from the light source lamp 2411 in step S12 (step S15).

When it is determined "Y" in step S15, the light source controlling section 2614 outputs a predetermined control command to the light source driving section 2412 to turn off the light source lamp 2411 (step S16: light source control step). After step S16, the main control unit 261 may select either process for not reproducing image data and audio data of the optical disk (such as DVD video), or process for reproducing only non-visual data, such as audio data, of the optical disk (such as DVD video).

When it is determined "N" in step S15, the main control unit 261 again goes to step S13 to judge whether the shutter 22 is located at the opened position. That is, through execution of steps S13 through S15, the main control unit 261 performs process for preventing heat deterioration of the shutter 22 disposed at the closed position caused by light applied from the light source lamp 2411 during light emission in step S12.

According to one embodiment, the following advantages are offered. In one embodiment, the main control unit 261 included in the projector 1 has the startup information receiving section 2611, the closed condition checking section 2612, the medium judging section 2613, and the light source controlling section 2614. The main control unit 261 allows the light source lamp 2411 to immediately emit light without judging the type of the optical disk when the light passing opening 211 is at the opened position at the time of startup of the projector 1, based on the fact that the light passing opening 211 is opened in the normal condition by operation of the shutter 22 such that image light corresponding to the image data recorded on the optical disk may be enlarged and projected from the projector main body 2 through the light passing opening 211 when the optical disk attached to the reproduction device 3 by the user contains image data (such as DVD video). Thus, when the attached optical disk contains image data, the time which may be required until an image (image light) is formed (starting time of projector 1) becomes relatively shorter than that of the related art. Accordingly, ease of use may be improved.

When the light passing opening 211 is at the opened position at the time of startup of the projector 1, the main control unit 261 immediately allows the light source lamp 2411 to emit light without judging the type of the optical disk. Thus, the light source lamp immediately emits light based on the opened condition of the light passing opening 211 even when the attached optical disk is of the type used exclusively for non-visual information including audio (such as audio CD and DVD audio).

According to one embodiment, the main control unit 261 judges the type of the optical disk by the function of the medium judging section 2613 after performing immediate light turn-on control by the function of the light source controlling section 2614. When it is determined that the optical disk is of the type used exclusively for non-visual information, such as audio, by the function of the medium judging section 2613 after execution of the immediate light turn-on control, the light turn-off control is executed to turn off the light source lamp 2411. Accordingly, unnecessary light emission from the light source lamp 2411 may be eliminated, and power saving may be achieved.

The disclosure is not limited to the embodiments described and depicted herein, and it is therefore intended that modifications, improvements and the like which may offer the advantages of the various embodiments are included within the scope of the disclosure.

While the optical disk such as CD and DVD is used as the storage and/or recording medium in one embodiment, card-shaped recording medium such as MO and memory card may be employed.

While the shutter 22 is used as the blocking member in one embodiment, a covering member detachably attached to the circumference of the light passing opening 211 may be employed.

While the closed condition checking section 2612 judges whether the shutter 22 is located at the opened position or at the closed position based on the signal outputted from the position detection unit 23 in one embodiment, the closed condition checking section is not limited to this type.

For example, the closed condition checking section may judge whether the shutter 22 is located at the opened position or at the closed position based on an operation signal received from the operation panel 212 or the like having an input button for notifying that the shutter 22 is at the opened position and an input button for notifying that the shutter 22 is located at the closed position.

According to one embodiment, the medium judging section 2613 reads the information in the read-in region of the attached optical disk (management information), the folder structure (format) of the data recorded on the optical disk, and others by driving the disk drive 32 to judge the type of the optical disk.

However, the medium judging section may judge the type of the optical disk according to a signal outputted from a mechanism for optically or mechanically detecting the thickness of the optical disk based on the fact that thickness of the optical disk used exclusively for non-visual information, such as audio (CD), is different from that of the optical disk containing image data (DVD).

Alternatively, the medium judging section may judge the type of the optical disk according to an operation signal outputted from the operation panel 212 having an input button for notifying that the attached optical disk is of the type used exclusively for non-visual information, such as audio, and an input button for notifying that the attached optical disk contains image data, for example.

According to one embodiment, the main control unit 261 judges the type of the optical disk when the shutter 22 is located at the closed position at the startup of the projector 1, and then executes reproduction of audio data stored in the optical disk when it is judged that the optical disk is of the type used exclusively for non-visual information, such as audio.

However, in case that the optical disk attached to the reproduction device 3 by the user is of the type used exclusively for non-visual applications including audio, the main control unit may immediately execute reproduction of the audio data stored in the optical disk when the shutter 22 is located at the closed position at the startup of the projector 1 without judging the type of the optical disk, based on the fact that the light passing opening 211 is generally set at the closed position by operation of the shutter 22 because projection of image light from the projector main body 2 is unnecessary, for example.

The light modulation device 242 according to one embodiment may be constituted by a transmission type liquid crystal panel, a reflection type liquid crystal panel, DMD (digital micromirror device, trademark of U.S. Texas Instruments Inc.), or other device. The projector according to one embodiment is capable of reducing starting time and increasing ease of use is applicable to a projector used for presentation and home theater.

This application is intended to cover any adaptations or variations of the embodiments discussed herein. Therefore, it is manifestly intended that embodiments in accordance with the present disclosure be limited only by the claims and the equivalents thereof.

What is claimed is:

1. A projector, comprising:
   a projector main body configured to form image light by modulating light emitted from a light source according to image information and to enlarge and to project the image light;
   a reproduction device configured to reproduce information recorded on a recording medium coupled to the reproduction device, and combines with the projector main body to form one body of the projector;
   a light passing opening provided on an outer housing of the projector main body and configured to pass the image light through the light passing opening;
   a blocking member configured to selectively close the light passing opening; and
   a control unit configured to control the projector, wherein the control unit includes
   a startup information receiving section configured to receive startup information about startup of the projector,
   a closed condition checking section configured to check whether the light passing opening is closed by the blocking member or not,
   a medium judging section configured to judge types of information available on the recording medium, and
   a light source controlling section configured to control operation of the light source based in part on the check result of the closed condition checking section and the judgment result of the medium judging section after the startup information receiving section receives the startup information, the light source controlling section configured to:
      execute immediate light turn-on control of the light source to immediately emit light when the closed condition checking section determines that the light passing opening is in an opened condition; and
      execute light turn-off control to turn off the light source after execution of the immediate light turn-on control when the type of the recording medium is determined to be exclusively non-visual by the medium judging unit.

2. The projector according to claim 1, wherein the light source controlling section is further configured to execute light turn-off control to turn off the light source when the type of the recording medium is determined to be exclusively used for audio by the medium judging unit.

3. A control method of a projector having a projector main body configured to form image light by modulating light emitted from a light source according to image information and to enlarge and to project the image light through a light passing opening on an outer housing of the projector, and a reproduction device configured to reproduce information recorded on a recording medium coupled to the reproduction device, the reproduction device being combined with the projector main body into one body of the projector, the control method comprising:
   receiving startup information about startup of the projector;
   checking a closed condition of a blocking member to check whether the light passing opening of the projector is closed by the blocking member or not;
   judging types of the recording medium coupled to the reproduction device; and
   controlling operation of the light source based on the closed condition checking and the recording medium judging after the startup information is received,
   wherein the controlling the light source comprises:
      immediately turning on the light source when the light passing opening is determined to not be in the closed condition, and
      turning off the light source after immediately turning on the light source when the type of the recording medium is determined to be exclusively non-visual.

4. A non-transitory storage medium on which a control program of a projector is recorded in such a manner as to be readable by a computer, the projector including a projector main body which forms image light by modulating light emitted from a light source according to image information and enlarges and projects the image light, and a reproduction device which reproduces information recorded on a recording medium attached to the reproduction device, the reproduction device being combined with the projector main body into one body, the control program comprising:
   a program under which a control unit of the projector executes the control method according to claim 3.

5. A projector readable non-transitory storage medium having program code embodied therein for causing one or more electronic projector systems on a projector to provide projection control information, the projector being configured to form image light by modulating light emitted by the light source according to image information and to enlarge the image light and to project the image light, said program code comprising:
   program code configured to cause a projector to receive startup information relating to startup of the projector;
   program code configured to cause a projector to determine a relative position of a blocking member of the projector to check whether image light may pass through a light passing opening in the projector;
   program code configured to cause a projector to determine an information type of a recording medium; and
   program code configured to cause a projector to control a light source of the projector based on the determined relative position and the determined information type,
   wherein the program code configured to cause the projector to control the light source is configured to:

immediately turn on the light source when the light passing opening is determined to be in the opened condition, and turn off the light source after immediately turning on the light source when the type of the recording medium is determined to be exclusively non-visual.

6. The program code as recited in claim 5, wherein the program code is configured to cause a projector to activate the light source to the form image light when the information type is visual.

7. The program code as recited in claim 5, wherein the program code is configured to cause a projector to turn off the light source when the relative position is closed.

* * * * *